Patented June 11, 1940

2,203,873

UNITED STATES PATENT OFFICE 2,203,873

POLYMERS OF HIGH MOLECULAR WEIGHT AND PROCESS OF PRODUCING SAME

Martin Mueller-Cunradi, Ludwigshafen-on-the-Rhine, and Michael Otto, Oppau, Germany, assignors to I. G. Farbenindustrie Aktiengesellschaft, Frankfort-on-the-Main, Germany No Drawing. Application June 1, 1937, Serial No. 145,828

6 Claims. (Cl. 260—94)

The present invention relates to improved polymers of high molecular weight and more specifically to hydrocarbon polymers of the linear or chain type prepared from isobutylene and other iso-olefins. Such polymers are useful for many industrial purposes. These products will be described below along with an improved method for their manufacture. The present case is a continuation in part of a prior application, Ser. No. 709,294, filed February 1, 1934.

Iso-olefins, and isobutylene in particular, have long ago been converted into low molecular weight polymers such as dimers, trimers and tetramers by use of catalysts such as sulphuric acid, aluminum chloride and the like at atmospheric or elevated temperatures. These materials are non-viscous, limpid liquids and are useful for gasoline, but even the heaviest of this type do not possess sufficient viscosity to be useful as lubricants. Iso-olefins have likewise been polymerized to materials of medium molecular weight, for example to molecular weights from about 1,000 to 25,000 or thereabout, which materials are thick, viscous liquids with decided lubricating qualities. While they are very viscous, they are still to be classed as liquids. Such materials have been made by polymerizing the iso-olefins, isobutylene in particular, with catalysts, of the type of aluminum chloride and boron fluoride while maintaining the reaction mixture at a temperature below —10° C.

It has now been found that products of considerably higher molecular weight can be produced from iso-olefins, especially from isobutylene. These materials range in molecular weight from about 27,500 to 200,000 or 250,000 and even higher. The molecular weight limit of 27,500 is critical as will be shown in the examples below. While some of these materials exhibit cold flow, they are definitely out of the liquid range and are solid in character because they show considerable resistance to distortion under pressure, which is the primary distinction between liquid and solid, the former being relatively easily deformed. They are plastic and elastic and may be termed rubber-like in that sense although they do not resemble rubber chemically; that is, they are substantially fully saturated while rubber is highly olefinic and they are remarkably resistant to oxidation at low temperatures while rubber is not.

These high molecular weight solid polymers are made from iso-olefins, in particular from isobutylene, by polymerization with catalysts of the Friedel-Crafts type such as aluminum chloride, zinc chloride, ferric chloride and titanium fluoride, but the readily volatilizable members of the group are by far the most desirable, especially boron fluoride which is normally gaseous. In order to obtain these high molecular weight materials, it is necessary to operate at low temperatures, for example below —30° C. and preferably at much lower temperatures, for example —60° or —80° C., and to maintain this low temperature during the entire course of the reaction. The generation of heat during polymerization is considerable and if special care is not taken to rapidly absorb the heat, the temperature is found to rise rapidly and to prevent the formation of the higher polymers. Another important and essential feature in obtaining these high molecular weight polymers is to conduct the polymerization with highly purified raw materials. The presence of even minute amounts of certain materials in some way inhibits polymerization so that low molecular weights are obtained. The presence of saturated hydrocarbons is not objectionable and it is usually desirable to work in the presence of such material to act as a solvent.

The most objectionable materials which are likely to be found in the raw material have been identified as sulfur compounds and oxygen derivatives of hydrocarbons such as alcohols, aldehydes, organic acids and the like, and the greatest care should be used to reduce the amounts of such materials to the lowest possible proportion. Alkyl halides are also likely to occur if the solvent is re-used and care should be taken to reduce such material to the merest traces. Olefins of less than 4 carbon atoms are not found to be objectionable, ethylene and propylene not at all and butylenes only if present in proportions materially above say 10 or 15%. If the operation is carried out at very low temperatures of the order of —60 to —100° C., lower olefins can be present in almost any proportion without adverse effect. Olefins containing more than 4 carbon atoms are more objectionable and should be removed. The greater the number of carbon atoms in the olefin, the more objectionable they appear to be. In addition to these compounds may also be included aromatics such as benzol, toluol and the like.

Iso-olefins are obtained from several different sources; first, from the cracked gases obtained from petroleum. Such materials are apt to contain in addition to other olefins relatively small amounts of sulfur in various forms. The iso-olefins may also be obtained as by-products of methanol synthesis. The material obtained from this source is apt to contain other olefins and small amounts of oxygen-containing materials. Iso-butane or other iso-paraffins may be dehydrogenated by well known means to produce the iso-olefins and besides the other impurities, such a product is apt to contain iso or normal olefin polymers which must be largely removed. It will be understood that the particular purification process must to some extent depend on the source of the raw materials. Impurities of higher or lower molecular weight can be separated by distillation, but it must be carried out under careful conditions.

Sulfur compounds may be removed in a variety of ways, depending on the particular type of sulfur. Mercaptans, for example, are ordinarily removed by washing with caustic soda or other alkalis and hydrogen sulfide is removed in the same manner. Disulfides which are not amenable to such treatment may be removed by treatment with heavy metals such as copper or copper oxide and the material can then be treated with soda or other suitable agent to remove the hydrogen sulfide produced. The raw material may also be subjected to hydrogenation under well known conditions under which the sulfur compound is converted into hydrogen sulfide which can be removed in the usual way. There is usually some loss of iso-olefin during hydrogenation but conditions are known under which the removal of sulfur can be effected to a high degree without too great a loss of the iso-olefin. Oxygen-containing materials such as the alcohols are best removed by careful distillation although it may be necessary in some instances to redistill several times in order to produce a material in which the impurities are reduced to the merest traces. It is sometimes advantageous to continue the purification treatments for example to carefully distill over caustic soda or alcoholic soda so as to remove most of the sulfur and separate higher and lower boiling impurities in a single operation.

The purification method will therefore be a combination of any of the above methods depending on the particular impurities found in the material. As mentioned above, it is usually desirable to conduct the polymerization in the presence of an inert solvent and it is found that alkyl fluorides and other halides are often found in the recirculated solvent. These may be removed by careful distillation, but preferably by the action of activated carbon or other adsorbents.

It will be understood from the above that a relatively high degree of purification, at least in respect to the materials mentioned above, is necessary to prepare an iso-olefin stock from which the present high molecular weight solid polymers are produced, although it is difficult to express the amounts in numerical terms. In order to illustrate the order and magnitude of the impurities which can be tolerated and the degree of purification required, it may be stated that in carefully conducted experiments in which the same polymerization procedure was used, it was found that as little as .15% of a mercaptan (B. P. —30° C.) when added to a purified sample of isobutylene gave a liquid polymer having a molecular weight of 5,000 when the same sample under the same conditions but to which no impurity had been added gave a solid polymer of high molecular weight. When .05% of the same mercaptan was added to the purified isobutylene a liquid polymer with a molecular weight of 12,500 was obtained on polymerization. In a third instance .15% of ethyl thioether was added to a highly purified isobutylene and in this case a liquid polymer with a molecular weight of 9,000 was produced. The amount of alcohols that can be tolerated is slightly more than the above, for example .5 to 1.0%, although it is desirable to reduce the amount below this quantity. In the case of the alkyl fluorides, the presence of 1% based on the isobutylene caused a very large reduction in molecular weight and even as little as .2% gave a marked decrease in molecular weight. These amounts are significant only at the particular temperatures and conditions employed and cannot be taken as absolute because at relatively lower temperatures larger amounts of poison can be tolerated.

The highest degree of purification is accomplished by converting the isobutylene into some other chemical substance which may be purified and then reconverted to isobutylene. As one instance of this the isobutylene may be polymerized for example with 50 to 70% sulfuric acid at low temperature and then heated to about 100° C. to effect polymerization, which produces di and triisobutylene without affecting other olefins. This polymer is then separated by distilling off impurities and unpolymerized material, then depolymerizing the isobutylene polymer either by heat alone or by cracking catalysts such as clay. Another method is to convert the isobutylene into isobutyl alcohol which can be done by reacting with 60–65% sulfuric acid at low temperature followed by addition of water and hydrolysis. The alcohol is distilled off and may be dehydrated by the action of alumina or other well known catalysts suitable for the purpose. Such methods are desirable in producing the very highest molecular weight polymers.

The polymers produced by the present process are solid and are normally clear and colorless. As stated above, even the higher products give evidence of slow plastic flow such as is found in all solid pitches, tars and asphalts. The molecular weights can be controlled quite accurately by highly purifying the raw material and adjusting the temperature under which polymerization is obtained. With the same stock, the lower the temperature the higher will be the molecular weight obtained. The solid polymers may be milled and mixed with other materials in this way. They may be cut with a sharp knife and are found to have measurable tensile strengths at room temperatures. They also show marked resistance to deformation under pressure. The lower molecular weight materials, in the range from 27,500 to 50,000 have lower tensile strengths than the materials above 60,000 and also less resistance to deformation under compression. Above this latter figure there does not appear to be much change in the property. These products are freely soluble in aliphatic hydrocarbons such as gasoline, kerosene, gas oils and lubricating oils. They are also soluble in aromatic solvents such as benzol and toluol, although they do not appear to be so readily soluble in these materials as in the aliphatic hydrocarbon solvents. They are precipitated from the solutions on the addition of lower molecular weight oxygen containing solvents such as ethyl or methyl alcohols, acetone and the like.

*Example I*

In order to demonstrate the critical molecular weight at which the polymers of isobutylene become solid, a series of different molecular weight polymers ranging from 15,000 to 60,000 were prepared.

5 gr. samples of these were placed between polished brass plates in a 6" x 6" Carver press and were subjected to a pressure of 6000#/sq. in. while at room temperature. The initial cross sectional area of the samples as measured on the plate was 4.5 cm. and the area was measured after the pressure was applied and further spread has substantially stopped.

It was found that in the range from 15,000 to 25,000 molecular weights the area increase was inversely proportional to the molecular weight and the decrease in extension of area was very rapid. Similarly in the range from 30,000 to 60,000 the decrease in extension of area was again directly proportional to the molecular weight but is very small. In plotting the two curves there was found to be a sharp break at a molecular weight of 27,500.

Example II

In a second series of tests to determine the same point A. S. T. M. penetrations (room temperature) were taken on a series of polymers ranging from 10,000 to 60,000 molecular weights. The load on the pin was 0 gr.

| Molecular weight | Penetration | Average |
|---|---|---|
| 15,000 | 80, 80 | 80 |
| 25,000 | 42, 37, 41 | 40 |
| 30,000 | 34, 33, 34 | 33.7 |
| 60,000 | 26, 27 | 26.5 |

These data when plotted show a sharp break at 27,500.

In a third series of tests the load in the pin was 50 gr. and the data were collected as before:

| Molecular weight | Penetration | Average |
|---|---|---|
| 15,000 | 123, 120 | 121.5 |
| 25,000 | 64, 62, 64 | 63.3 |
| 30,000 | 54, 50, 52 | 53 |
| 60,000 | 37, 38 | 37.5 |

When the data in the above table are plotted, there is found to be a sharp break at 27,500.

Example III

Isobutylene was produced from an isobutyl alcohol by passing the same over aluminum oxide at 400° C. The isobutylene was condensed and carefully redistilled under pressure. This highly purified material was then polymerized at −80° C., the temperature being maintained throughout the reaction by the direct addition of solid carbon dioxide. The product obtained was a clear, colorless solid having plastic and elastic properties. It had a molecular weight of 40,000 according to the Staudinger method.

Example IV

Isobutane obtained by fractionation of a field butane was dehydrogenated by passing over a catalyst at about 1030° F. The effluent product on condensation showed a content of 25% olefin, 90.5% of the feed being recovered as liquid.

This product was then polymerized at −73° F. by means of boron fluoride cooled by solid carbon dioxide and yielded a polymer amounting to 57% of the original isobutane or 63.5% of the isobutylene. This polymer had a molecular weight of 23,000 (Staudinger).

In a similar run in which the dehydrogenation product was carefully distilled to 5–10% bottoms over alcoholic caustic potash, the yield of polymer was about the same but it had a molecular weight of 43,000.

In a similar run using the same polymerization technique but at a temperature of −103° C. the polymer had a molecular weight of 58,000.

Example V

A butane-butylene cut obtained by fractionation of cracked gasoline contained about 12.5% isobutylene along with impurities of the type usually found in oils, sulfur, and other olefins. The crude cut was agitated with 20 to 25% of its volume of 60–65% sulfuric acid while maintained at 15 to 20° C. The mass was settled and a naphtha layer withdrawn and the acid layer was heated for a short time, approximately 1 minute to 110° C. then cooled and settled at 40 to 50° C. An oily layer consisting of 65% isobutylene dimer and 35% trimer was withdrawn and carefully fractionated to segregate the dimer cut (98–120° C.) and the trimer (150–180° C.)

The latter cut is passed over a clay catalyst at at 800–850° F. and the product cooled, condensed, revaporized by heating to 110° F., cooled slightly to condense heavy ends, washed with soda, and finally with sodium plumbite solution. The product is then redistilled under a high reflux ratio say 7 to 1 and this may be done over caustic soda for best results and the isobutylene is now ready for polymerization.

Ethylene is carefully scrubbed with sulfuric acid to remove ethyl ether, compressed and liquefied. Two gallons of liquefied isobutylene precooled to −78° C. are fed to a 10 gallon reactor and to this two gallons of the liquefied ethylene are added. To a separate two gallons of liquefied ethylene, boron fluoride is added through a capillary tube under 2 inches mercury pressure for one or two minutes. Then this mixture of ethylene and boron fluoride is added to the reactor whereupon a vigorous reaction occurs and a large volume of gas is liberated and 7 to 8 pounds of the high molecular weight product remain in the reactor. It has a molecular weight of 150,000 (Staudinger).

Example VI

Crude butylene cut such as used in the prior example is carefully heated with 60–65% sulfuric acid at about 20° C. The product is settled and the acid layer is diluted with one and one-half times its volume of water and carefully distilled. A constant boiling mixture containing tertiary butyl alcohol and 10% water is obtained at 79.5° C.

The product so obtained is dried with anhydrous potassium carbonate and refractionated, then dehydrated by refluxing with an equal volume of 40% phosphoric acid. This is preferred to sulfuric acid because the latter introduces small amounts of sulfur.

The isobutylene is washed with water to remove traces of alcohol and is again dried. It is now ready for polymerization. To one volume of liquid isobutylene is added 1 volume of liquid ethylene prepared as in the previous example. Another volume of ethylene is treated with $BF_3$ as described in the prior example and this mixture is now added to the mixture of isobutylene and ethylene. An instantaneous reaction occurs giving about 90% yield of a polymer having a molecular weight of 280,000 Staudinger. It is nearly white, rubber-like and contains much dissolved gas. When this is removed it is colorless and clear.

The present invention is not to be limited to any theory of the method of polymerization, nor to any particular method for purifying or preparing the isobutylene, but only to the following claims in which it is desired to claim all novelty inherent in the invention.

We claim:

1. An improved process for producing solid polymers of iso-olefins comprising preparing an iso-olefin in a condition of high purity such that sulfur its compounds, normal olefins of more than 4 carbon atoms, alkyl halides oxygen containing derivatives of hydrocarbons and aromatic hydrocarbons are reduced to the merest traces and then polymerizing the purified iso-olefin while maintaining a temperature below −30° C. throughout the reaction.

2. An improved process for producing solid elastic polymers of isobutylene comprising preparing an isobutylene by reducing the amount of sulfur, its compounds, normal olefins of more than 4 carbon atoms, oxygen containing derivatives of hydrocarbons, alkyl halides and aromatic compounds to the merest traces, and then polymerizing the highly purified product with boron fluoride while maintaining a temperature below −30° C. throughout the reaction.

3. An iso-olefin polymer, being a plastic and elastic rubber-like solid at ordinary temperatures, having a molecular weight above about 27,500, substantially colorless, soluble in hydrocarbon solvents, insoluble in methyl alcohol, ethyl alcohol and acetone and prepared by the process of claim 1.

4. An isobutylene polymer, being a plastic and elastic rubber-like solid at ordinary temperatures, having a molecular weight above about 27,500, substantially colorless, soluble in hydrocarbon solvents, insoluble in methyl alcohol, ethyl alcohol and acetone and prepared by the process of claim 2.

5. A process in accordance with claim 1, in which the purified iso-olefin is polymerized in an inert solvent having the condition of high purity.

6. A process in accordance with claim 2, in which the boron fluoride is added to liquefied ethylene of high purity before it is used to polymerize the highly purified isobutylene in the presence of the liquefied ethylene.

MARTIN MUELLER-CUNRADI.
MICHAEL OTTO.